(12) United States Patent  (10) Patent No.: US 8,393,299 B1
Bernat  (45) Date of Patent: Mar. 12, 2013

(54) TOY GUN

(76) Inventor: Jeffrey Bernat, Minneapolis, MN (US)

( * ) Notice: Subject to any disclaimer, the term of this patent is extended or adjusted under 35 U.S.C. 154(b) by 135 days.

(21) Appl. No.: 12/949,750

(22) Filed: Nov. 18, 2010

Related U.S. Application Data

(60) Provisional application No. 61/262,388, filed on Nov. 18, 2009.

(51) Int. Cl.
A10K 15/02 (2006.01)
(52) U.S. Cl. ...................... 119/702; 40/70.11
(58) Field of Classification Search ............... 119/702; 42/70.11
See application file for complete search history.

(56) References Cited

U.S. PATENT DOCUMENTS

| | | | | | |
|---|---|---|---|---|---|
| 403,096 | A | * | 5/1889 | Egler | 124/21 |
| 899,448 | A | * | 9/1908 | Grobl | 124/27 |
| 1,580,854 | A | * | 4/1926 | Piessens | 124/26 |
| 1,615,266 | A | * | 1/1927 | French | 473/511 |
| 1,927,424 | A | * | 9/1933 | Trubenbach et al. | 124/26 |
| 2,600,883 | A | * | 6/1952 | King | 124/63 |
| 2,633,119 | A | * | 3/1953 | Bauderer et al. | 124/27 |
| 2,636,738 | A | * | 4/1953 | Abagoff | 473/511 |
| 2,962,837 | A | * | 12/1960 | Lemelson | 446/193 |
| 3,166,321 | A | * | 1/1965 | Fleishman | 124/27 |
| 3,219,022 | A | * | 11/1965 | Hagemeyer | 124/61 |
| 3,897,061 | A | * | 7/1975 | Grattan | 473/511 |
| 4,241,716 | A | * | 12/1980 | Tsui | 124/27 |
| D328,120 | S | * | 7/1992 | Aigner | D22/104 |
| 5,253,873 | A | * | 10/1993 | Grattan | 473/511 |
| 5,292,134 | A | * | 3/1994 | Schlundt et al. | 473/511 |
| 5,769,064 | A | | 6/1998 | Lu et al. | |
| 5,979,424 | A | * | 11/1999 | Alvarez et al. | 124/16 |
| 6,223,941 | B1 | * | 5/2001 | Nealey | 222/82 |
| 6,755,716 | B2 | | 6/2004 | Agostini et al. | |
| 7,213,724 | B1 | | 5/2007 | Langer et al. | |
| 7,448,371 | B2 | * | 11/2008 | Sapir | 124/16 |
| 7,537,001 | B2 | * | 5/2009 | Ma | 124/69 |

OTHER PUBLICATIONS http://www.swordworks.org/sca/clothing/oldgun.html.
http://www.cramster.com/answers-nov-08/physics/fun-spring-gun-spring-loaded-toygun-shoot-ball-mass-stra_388349.aspx.

* cited by examiner

Primary Examiner — Isam Alsomiri
Assistant Examiner — Justin Benedik
(74) Attorney, Agent, or Firm — Underwood & Associates, LLC

(57) ABSTRACT

A toy gun is described. The toy gun includes a firing ram configured in a toy gun barrel to be capable of shifting from a first, pre-firing configuration to a second, resting configuration. The barrel comprises a tapered portion capable of holding balls of variable size substantially within the barrel, and a portion of the firing ram is capable of contacting a ball held within the tapered portion when the firing ram is in the resting configuration.

17 Claims, 9 Drawing Sheets

TOY GUN

CROSS REFERENCE TO RELATED APPLICATION

This application claims priority under 35 U.S.C. §119(e) from U.S. Provisional Patent Application No. 61/262,388, by Jeffrey Bernat, entitled "Pick n Shoot," filed Nov. 18, 2009 which is incorporated herein in its entirety by reference for all purposes.

STATEMENT REGARDING FEDERALLY SPONSORED RESEARCH OR DEVELOPMENT

None.

TECHNICAL FIELD

This disclosure relates to toy guns capable of shooting tennis balls and the like.

BACKGROUND

Toy guns are used by people of all ages for entertainment and sporting activities. For centuries, children have enjoyed shooting various projectiles from toy guns, e.g., cork pieces, ping-pong balls, etc., which are generally fired at speeds low enough so as not to damage property or inflict personal injury. Similarly, in the last twenty to thirty years, so-called "paintball" has become a popular pastime for adults, where a user fires small paint-filled balls from an air-powered gun at one or more opponents under a simulated combat scenario.

Most modern toy guns fire projectiles using pneumatic pressure, where an object is expelled from a chamber after pressurized air is rapidly introduced, or a rapid drop in air pressure forces the object out of the chamber and through a barrel. Some toy guns include chambers for storing and accessing pressurized gasses such as carbon dioxide contained in rigid vessels; other guns include mechanisms for manually building air pressure, such as through the use of single- and multi-stroke hand pumps and the like.

SUMMARY

In general, according to one embodiment, a toy gun is described. The toy gun includes a firing ram configured in a toy gun barrel to be capable of shifting from a first, pre-firing configuration to a second, resting configuration. The barrel comprises a tapered portion capable of holding balls of variable size substantially within the barrel, and a portion of the firing ram is capable of contacting a ball held within the tapered portion when the firing ram is in the resting configuration.

In one embodiment, the toy gun further includes a triggering mechanism configured to allow the firing ram to shift from the pre-firing configuration to the resting configuration. In one embodiment, the triggering mechanism includes a trigger body that includes a tooth that engages a recess in the firing ram configured to receive the tooth and releasably hold the firing ram in the pre-firing configuration under the influence of shifting force. In one embodiment, the shifting force is provided by a resilient member, and the shifting force urges the firing ram toward the resting configuration from the pre-firing configuration.

In one embodiment, the resilient member is a bungee cord, rubber band, or spring. In one embodiment, the gun further includes a stop member configured to prevent the firing ram from shifting beyond a chosen point within the barrel as the firing ram shifts from the pre-firing configuration to the second resting configuration. In one embodiment, the stop member is a wall having a disk-like shape and an aperture to allow passage of a portion of the firing ram therethrough. In another embodiment the stop member is a wall portion of a tapered wedge, wherein the wall portion extends substantially normal to an interior surface of the barrel.

In one embodiment of a toy gun, the tapered portion capable of holding balls of variable size includes a tapered collar integral with the barrel. The collar has a diameter substantially equal to a bore of the barrel at a first end, and is tapered to have a diameter larger than the bore at a second end, wherein the second end comprises the terminus of the barrel.

In one embodiment of a toy gun the tapered portion capable of holding balls of variable size includes one or more tapered wedges fixed at an end of the barrel to gradually reduce the size of a ball that can fit inside the barrel as measured from the terminus of the barrel toward the opposite end of the barrel. In one embodiment, the one or more tapered wedges additionally act as a stop to prevent the firing ram from exiting the barrel when the gun is fired.

In one embodiment of a toy gun, the firing ram includes a spring mechanism fixed to a terminal end, and the spring mechanism is configured to boost the ball-launching power of the firing ram. In some cases, the spring mechanism is capable of being releasably locked in a compressed configuration until contact is made with the ball. In some cases the toy gun further includes, with respect to the spring mechanism, a compressible spring and a releasable lock that can hold the spring in a compressed configuration. The releasable lock has a trigger that can disengage the lock to allow the spring to decompress when the spring mechanism contacts the ball.

In general, according to one aspect, a gun capable of launching balls is described. The gun includes a gun barrel having a central bore therethrough, through which a firing ram can be shifted from a pre-firing configuration to a resting configuration by a force supplied by a resilient spring, band, or cord, connected at one end to the firing ram and at a different end to a portion of the barrel. The gun barrel has an end-tapered portion capable of holding balls of various sizes. The gun further includes a firing handle and a stabilization handle integral with the barrel, wherein the firing handle includes a triggering mechanism configured to both: 1) hold the firing ram in the pre-firing configuration when the firing ram is being urged toward the resting configuration by the force, and 2) release the firing ram from the pre-firing configuration when a trigger arm is shifted. In this embodiment, a portion of the firing ram extends into the end-tapered portion of the barrel to cause a ball wedged therein to become dislodged and expelled from the barrel. The force can be dependent upon a shifting distance of the firing ram from the resting configuration to the pre-firing configuration.

In one embodiment of the gun, one or both of the handles includes a hollow portion for storage purposes.

In one embodiment, the firing ram includes a handle at one end of the barrel configured for grasping and pulling the firing ram into the pre-firing configuration, and a spring member at an opposite end of the firing ram for providing additional launching force to a ball.

In one embodiment, the gun further includes air vents disposed on the barrel for allowing air within the barrel to rapidly escape when the firing ram is shifted from the pre-firing configuration toward the terminus of the barrel.

In one embodiment the gun further includes an armature for holding extra balls.

In one embodiment of a gun, the end-tapered portion is configured to receive tennis balls.

In general, according to yet another aspect, a method of exercising dogs is provided. The method includes inserting a ball into the tapered portion of a toy gun as described above, placing the firing ram in the pre-firing configuration, and activating a triggering mechanism to cause the firing ram to shift from the pre-firing configuration toward the tapered portion under power supplied by a resilient band or spring. A portion of the firing ram subsequently strikes the ball and the ball is ejected from the tapered portion for the dog to fetch.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The details of one or more embodiments are set forth in the accompanying drawings and the description below. Other features, objects, and advantages will be apparent from the drawings and detailed description, and from the claims.

DESCRIPTION OF DRAWINGS

The present embodiments are illustrated by way of example and not limitations in the figures of the accompanying drawings in which like references indicate similar elements, and in which.

DETAILED DESCRIPTION OF ILLUSTRATIVE EMBODIMENTS

Figure 1:
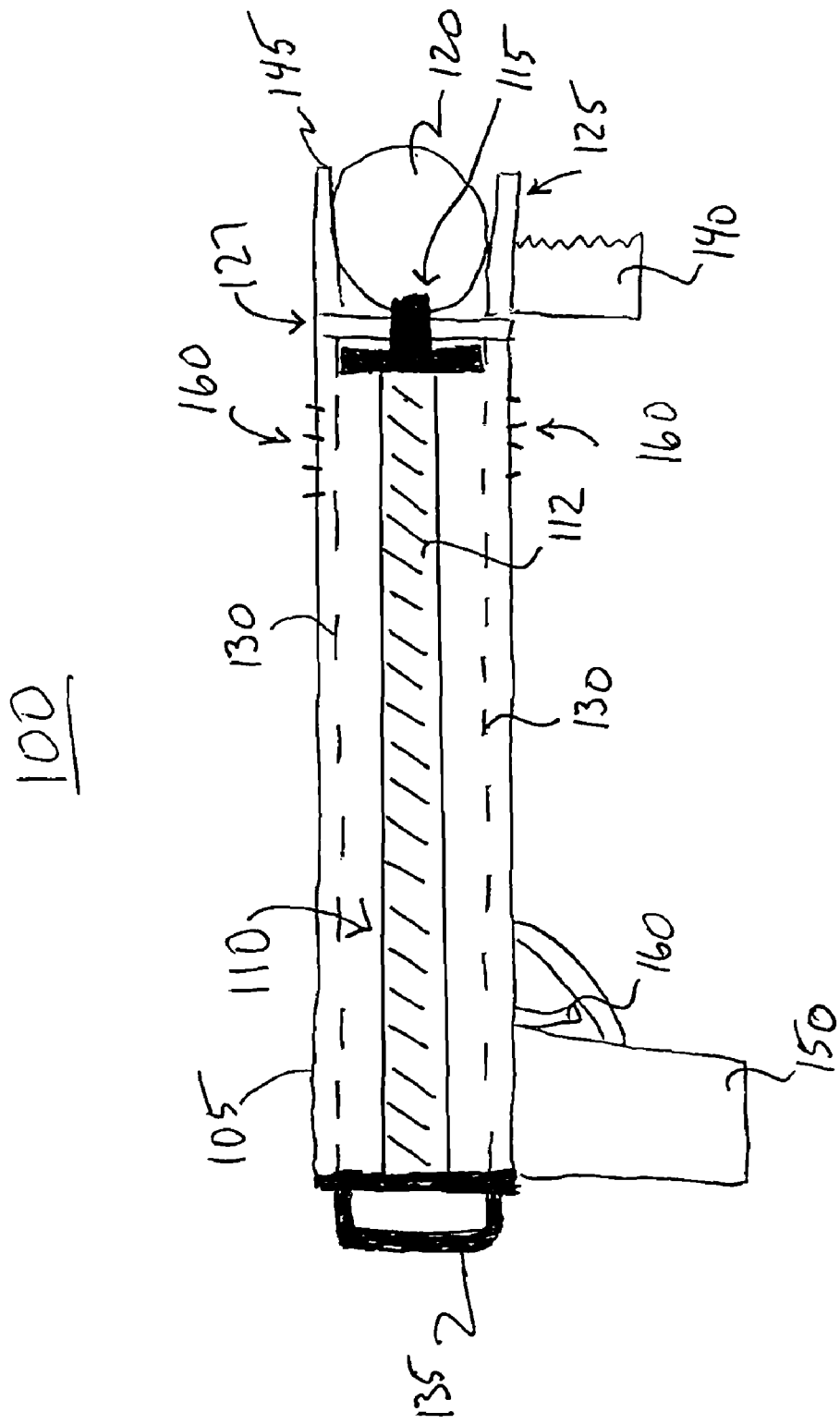
FIG. 1 is a toy gun according to one embodiment.

FIG. 1 is a toy gun (hereinafter "gun") 100 according to one embodiment. The gun 100 includes a substantially hollow barrel 105 that houses a slidable firing ram 110. The firing ram 110 includes an elongate shaft member 112 having a pin member 115 at one end and an integral handle member 135 at an opposite end. The barrel includes an integral stop member 127, which, in this embodiment is a disk-shaped wall having a central bore through which the pin member 115 can protrude. The stop member 127 minimizes the likelihood of the entire firing ram being launched from the barrel of the gun when it is fired, while at the same time allowing the kinetic energy of the ram to be imparted to a ball 120 via the pin member 115. The firing ram 110 can be shifted between a resting position (shown in FIG. 1) and a pre-firing configuration (shown in FIG. 2).

Bungee cords 130 connect the firing ram 110 to the barrel 105 and, when stretched to a pre-firing position, provide potential energy to shift the firing ram 110 along the long axis of the barrel 105. Those skilled in the art will recognize that bungee cord alternatives can be used and include, but are not limited to: bands (such as rubber bands), stretchable plastics and polymers, springs, and any other material that can resiliently return to a normal, resting configuration from a stretched or pulled configuration.

One end of the barrel 105 includes a collar portion 125 configured to receive and hold a ball 120. The collar portion 125 is tapered as shown in FIG. 1, where the interior diameter of the collar portion 125 is largest at the barrel terminus 145 and gradually decreases in a direction toward the stop member 127 (wherein the interior diameter is measured perpendicular to the long axis of the barrel 105). The tapered collar portion 125 allows a user to fire balls in a range of sizes from the gun, rather than being limited to balls that are substantially the diameter of the barrel 105 bore. Those skilled in the art will recognize that alternatives to an end-tapered barrel can be used to accomplish similar functionality. In one example, two plates can be mounted on the end of the barrel and configured in a tapered arrangement.

Figure 1B:
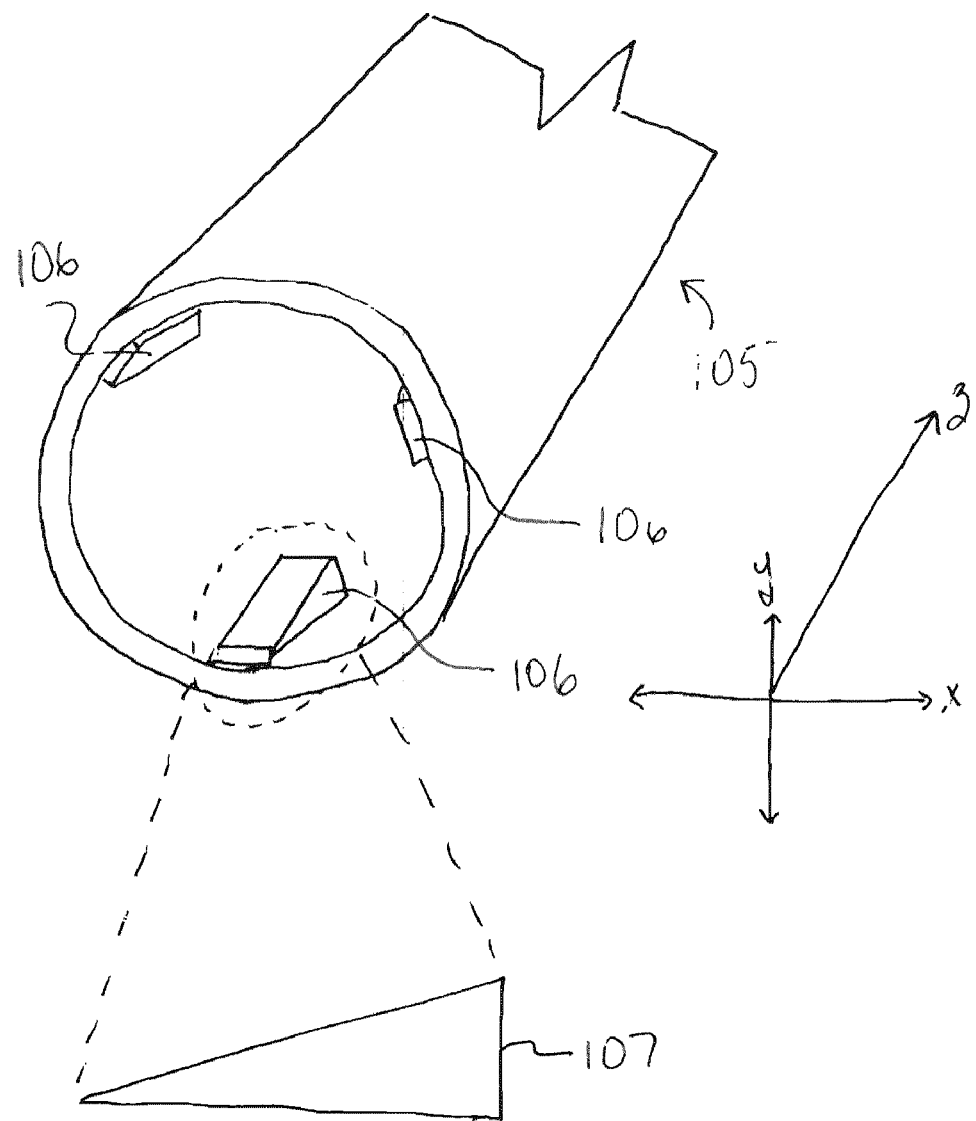

Referring now to FIG. 1B, in another embodiment, one end of the barrel 105 includes one or more tapered wedges 106 configured to gradually reduce the working inner diameter of the barrel bore (the effective diameter of the barrel 105 is reduced in the x-y plane as depicted in FIG. 1B). The tapered wedges 106 provide the capability to hold balls of different size in, or substantially within the end of the barrel 105. Furthermore, each tapered wedge 106 can include a stop wall 107 as depicted in the exploded side view of wedge 106. The stop wall 107 can be configured, and arranged within the gun barrel 105 to prevent the firing ram 110 from shifting beyond a chosen point and can be a functional alternative to a disk-like stop wall 127 described with respect to FIG. 1. The use of one or more tapered wedges 106 can provide advantages over the use of a disk-like stop wall 127; for example, when the gun is fired, air can escape the barrel 105 with greater velocity and inter-barrel air pressure can be reduced. Both factors can allow the firing ram 110 to travel faster within the barrel 105 and thus provide increased force for shooting balls from the gun.

The length of the pin member 115 can be adjusted so as to contact balls that are large enough that they are held at or near the barrel terminus 145 when the gun is fired. In one embodiment, the pin member 115 includes a spring member (not shown in FIG. 1) positioned so as to make contact with a ball held in the collar portion 125. The spring member can be adjustable in length (so as to extend the overall length of the pin member 115) and can assist in dislodging the ball—or providing additional ejection force—when the gun is fired. In some embodiments, the spring can be locked in a compressed, pre-firing configuration, and can be triggered to release spring energy when contact with the ball is made (i.e., when the gun is fired). The spring can be locked in a compressed configuration using, for example, triggerable lock-and-release mechanisms, releasable clamps, lock levers, and other mechanisms.

Referring back to FIG. 1, the gun 100 includes a stabilizing handle 140 and a trigger handle 150. The stabilizing handle 140 can be used to provide stabilization when cocking the gun 100, i.e., pulling back on the handle member 135 to stretch the bungee cords 130 into a pre-firing configuration. The trigger handle 150 provides an area for the user to grasp when firing the gun via the trigger arm 160. The trigger mechanism is explained in greater detail below.

Vent holes 160 allow air to rapidly escape the barrel 105 chamber when the gun is fired which can reduce the interior air pressure within the chamber and allow the firing ram to move forward at maximum velocity.

Figure 2:
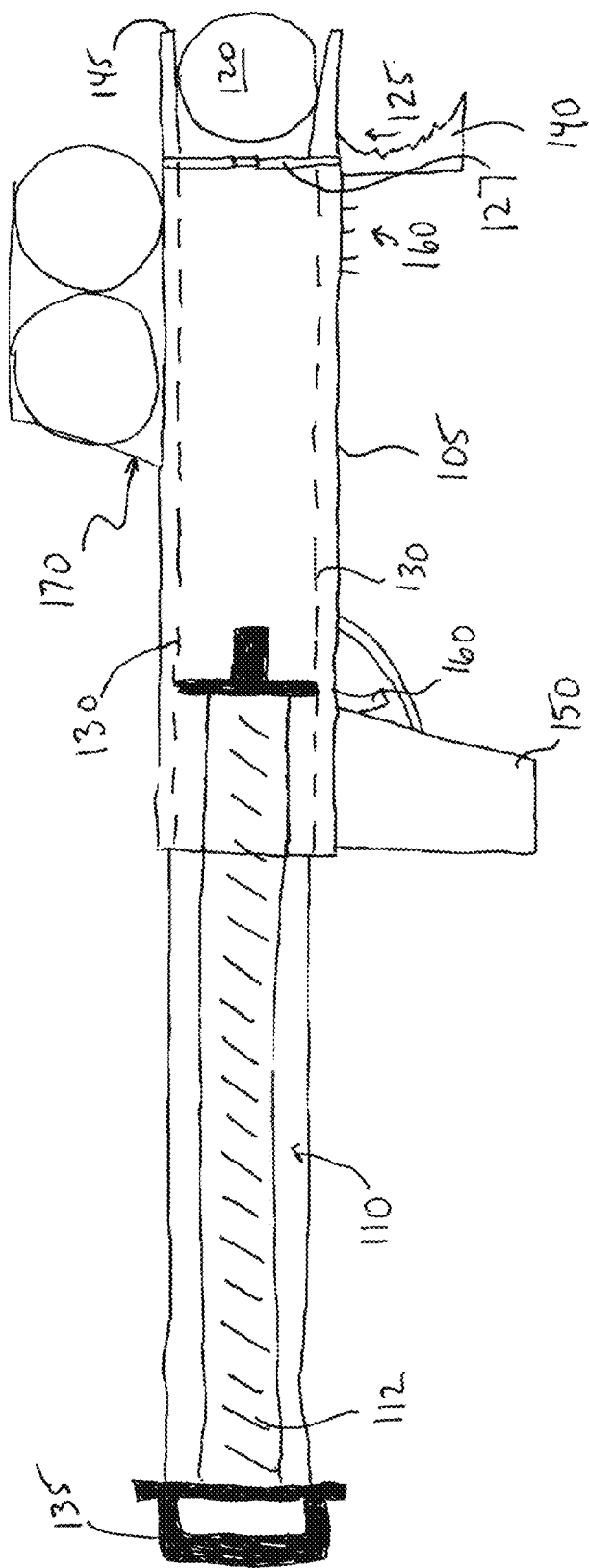
FIG. 2 is a toy gun according to one embodiment.

Referring now to FIG. 2, the gun 100 referred to in FIG. 1 is shown in a pre-firing configuration. In this configuration, the firing ram 110 has been pulled back into a cocked position, and the one or more bungee cords 130 are stretched, providing a source of kinetic energy for the shifting of the firing ram 110 toward the ball 120 when the gun is fired. In some embodiments, the handle 135 of the firing ram 110 can include a guide member (not shown in FIG. 1 or 2). A guide member can be a rod, dowel, or other, similar article that shifts within a hollow tube or guide fixed on the barrel 105. The guide member can assist in guiding the firing ram 110 in a substantially straight path along the long axis of the barrel 105 when the gun is fired.

FIG. 2 shows an arm 170 that can be used to carry extra balls. Arm 170 can hold balls in place using adhesives, frictional forces, or surfaces such as hook-and-loop fasteners, among others, and can be mounted anywhere along the barrel of the gun.

Figure 3:
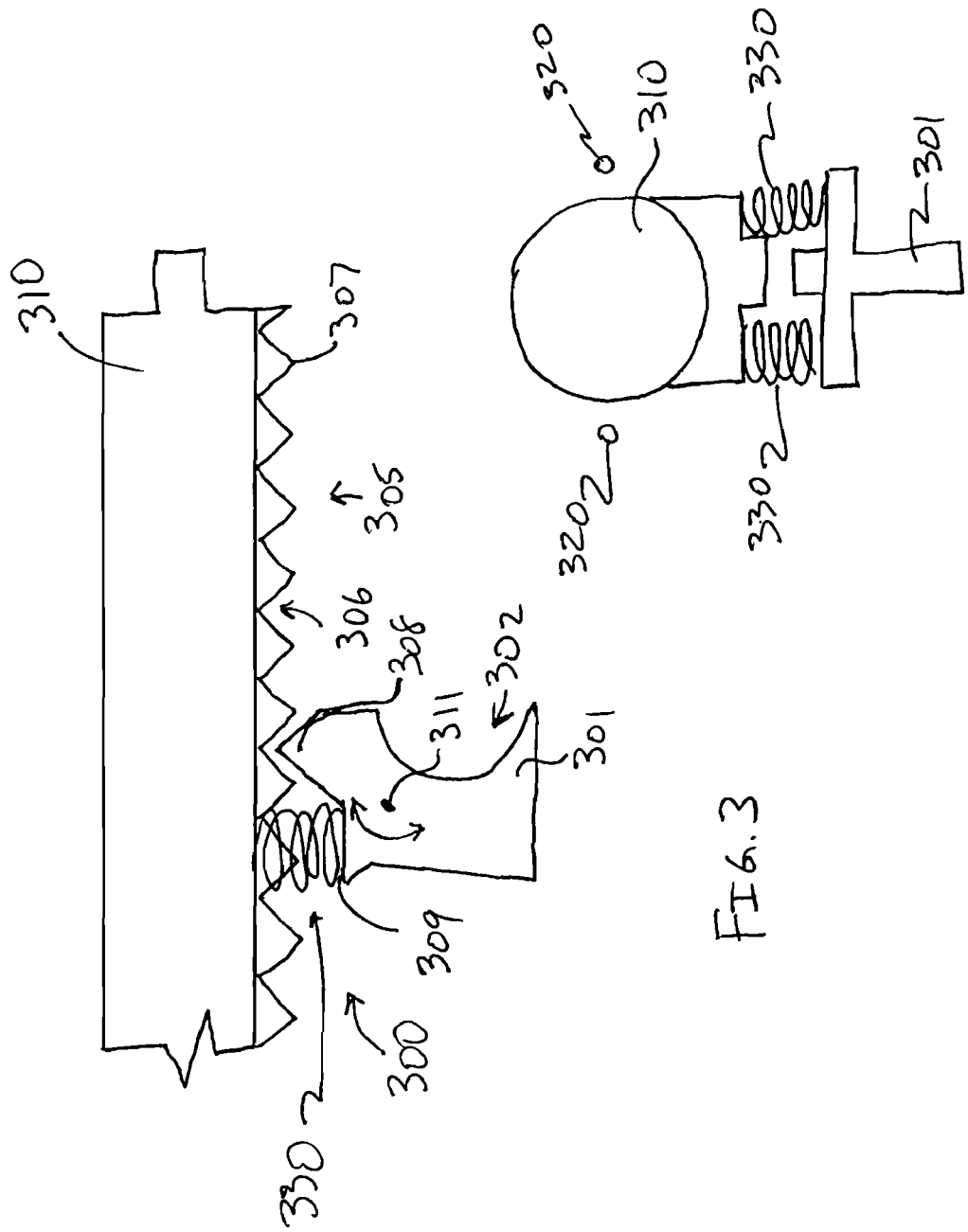
FIG. 3 is a triggering mechanism according to one embodiment.

Referring now to FIG. 3, a spring-loaded triggering mechanism 300 is shown. The triggering mechanism of FIG. 3 can be used for any toy gun embodiment disclosed herein or equivalents thereof. The triggering mechanism 300 includes a row of saw-tooth shaped ratchet teeth 305 evenly disposed along the long axis of a firing ram 310. Between each ratchet tooth is a substantially triangular-shaped recess 306 into which an equally shaped, substantially triangular tooth 308 disposed on a trigger body 301 can engage any of the recesses along the length of the ratchet teeth 305. The firing ram is releasably fixedly engaged with the trigger body when tooth 308 is engaged with a recess, e.g., recess 306, and prevents the gun from firing until the user pulls the trigger 302.

The trigger body 301 can pivot to allow the tooth 308 to releasably engage a recess in the row of ratchet teeth 305. In one embodiment, the pivoting action can be provided by one or more gears; in another embodiment, the pivoting action can be provided by a pin 311, dowel, or other article disposed through the trigger body 301 and providing an axis of rotation in the directions generally depicted by the double-headed arrow in FIG. 3; in yet another embodiment, the trigger body 301 can be formed from molds (e.g., using plastic injecting molding) so as to provide one or more integral posts that protrude from the trigger body 301 on opposite sides, generally in the location where pin 311 is shown; recesses can be configured in the body of the gun, e.g., the gun barrel, to receive the posts and provide the capability for axial motion of the trigger body 301 as generally depicted by the double-headed arrow in FIG. 3.

Tooth 308 is kept in releasable engagement with the ratchet teeth 305 by one or more springs 330. In the embodiment of FIG. 3, two springs 330 are disposed on opposite sides of the ratchet teeth 305. One end of each spring is connected to a portion of the barrel proximal to the firing ram as shown; the other end of each spring is connected to a planar floor 309 of the trigger body 301. The springs 330 are configured in the trigger mechanism 300 so as to provide constant force in opposing directions between the planar floor 309 and the portion of the barrel to which it is connected. Such force provides lever action to the trigger body 301 about the axis of rotation at the pin 311 location and keeps the tooth 308 in constant releasable engagement with a portion of the ratchet teeth 305 until the tooth 308 is disengaged by pulling the trigger 302.

Accordingly, to fire a cocked gun of the type described herein, a user can cause the trigger body 301 to rotate about the pin 311. In a preferred embodiment, the trigger body 301 has a trigger portion 302 that, when pulled according to the normal squeezing action used to fire a common gun, causes the trigger body 301 to rotate such that the tooth 308 disengages from the ratchet teeth 305. Disengagement of the tooth 308 from the ratchet teeth 305 permits the firing ram 310 to shift from a pre-firing configuration (e.g., FIG. 2) to a resting position (e.g., FIG. 1) at a chosen velocity as described below.

Referring now to FIGS. 1-3, the firing process of a toy gun of the type described herein is described. A user can load the gun by any suitable method, including manually inserting a ball in an end of the gun barrel. In embodiments where the gun barrel has a tapered end, or where the gun barrel includes one or more tapered wedges to effectively gradually decrease the inner diameter of the barrel, the user can push a ball into the barrel until it is fixedly held therein. The user can also insert balls into the barrel in a hands-free operation by pushing the end of the barrel over a ball when the ball is against a surface providing suitable resistance (such as the ground or a sidewalk). This operation can be particularly beneficial for users who are repeatedly firing a ball (such as shooting a ball for their dog to fetch) and bending over to pick up the ball each time would cause discomfort or fatigue. As some dog owners know, often times a ball becomes wet, slobbery, or muddy when playing "fetch"—thus, the hands-free loading operation can provide the advantage of not having to touch such a ball.

The gun can be cocked by shifting the firing ram into a pre-firing configuration (as depicted in FIG. 2), e.g., by grasping and retracting the handle 135 and thereby the firing ram 110. The speed at which the firing ram shifts from a pre-firing configuration after the gun is fired—and thus the resulting force of the firing ram against the ball—can be controlled in part by the type, strength, resilience, and elasticity factors of the bungee cords used. Users can also control the speed and force of the firing ram against the ball when the gun is fired by selecting how much elastic tension is applied to the one or more bungee cords. For example, if a user wants to launch a ball with maximum velocity from the barrel, they can pull the firing ram back as far as it will go; alternatively, in embodiments where a triggering mechanism similar to that described with respect to FIG. 3 is used, the user can pull the firing ram back to a variable position, e.g., half-way back, utilizing the capability of the ratcheting mechanism provided thereby.

In some embodiments and implementations, the bungee cord or other elastic article used to provide the energy to propel the firing ram can be strong enough that it becomes difficult for the user to manually cock the gun into a pre-firing configuration. The stabilizing handle (e.g., handle 140) can provide a step for a user to place their foot on, allowing them to use two hands or leverage other body muscle groups (i.e., back, legs) to cock the gun.

One the gun is cocked in a pre-firing configuration and a ball is lodged within, or substantially within the end of the gun barrel, the user can point the gun in a desired direction and fire the gun by activating the triggering mechanism (e.g., triggering mechanism 300). In a preferred embodiment, the user can fire the gun using a finger trigger as is known in the art for many types of handguns, rifles, shotguns, etc. Once the triggering mechanism is activated, the firing ram freely shifts toward the ball at a velocity determined, in part, by the type and elasticity of the bungee cords, and in part by the distance the user has retracted the firing ram from its resting configuration (e.g., as shown in FIG. 1). To prevent potential injury to persons and property, the firing ram is stopped in preferred embodiments by use of either a disk-like stop wall (e.g., stop wall 127) or through the use of tapered wedges as described above. Although the firing ram is stopped before the end of the barrel in these embodiments, the pin member of the firing ram (e.g., pin member 115) protrudes beyond the wall and is configured to strike a ball lodged in the end of the barrel and eject it from the barrel.

A gun of the type described herein, and any equivalents, can be used for a variety of purposes. For example, the gun can be used to play "fetch" with dogs or other animals that retrieve balls. In such use, fatigue, aches and pain, and boredom can be reduced as the user is not required to throw the ball repeatedly by hand. Moreover, those with debilitating disease or conditions who would otherwise be restricted or precluded from such activities (e.g., arthritis) can enjoy playing with their pet using fewer body motions and reduced effort.

Figure 4:
FIGS. 4-7 illustrate a boy exercising a dog according to one embodiment of a toy gun.

Referring now to FIGS. 4-7, a method for exercising a dog is shown. In FIG. 4, a gun of the type described herein is shown being held by a user. A tennis ball is held in the terminal end of the barrel by a tapered wedge. As shown, the ball is held in the gun by the tapered portion even though the gun is pointed toward the ground.

Figure 5:
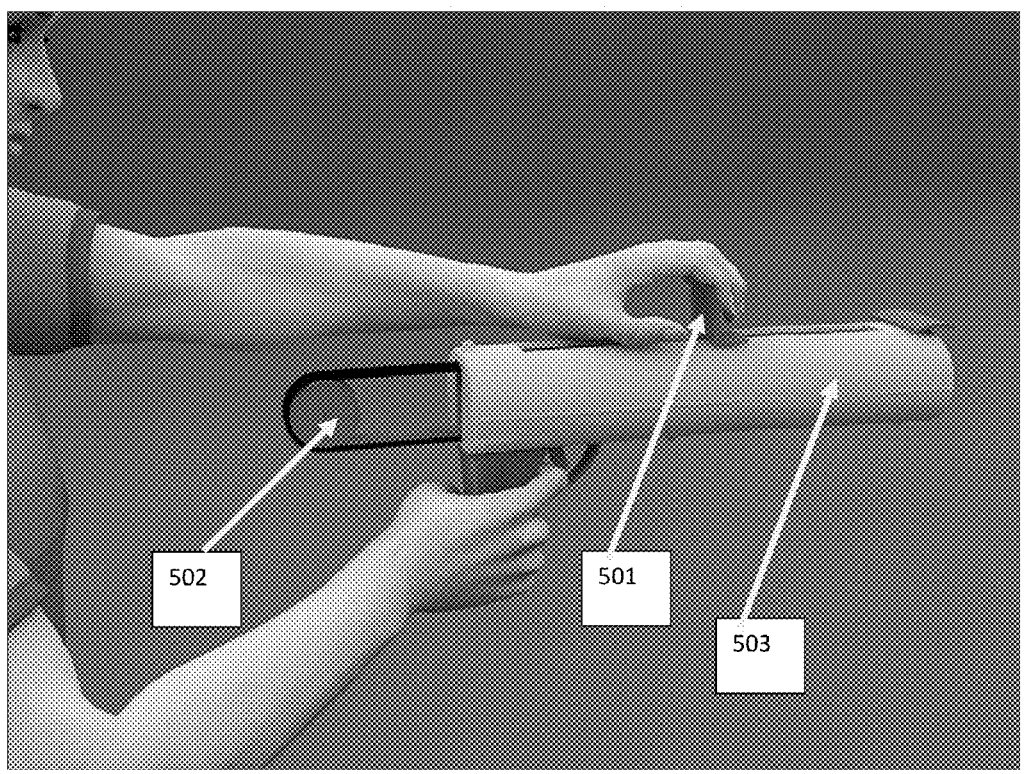

In FIG. 5, the user is grasping a top handle 501 integral with the firing ram 502. (The portion of the firing ram within the gun barrel 503 is not shown for clarity.) The user is shifting the firing ram to a pre-firing configuration and thereby increasing tension on bungee cords contained within the barrel 503 (not shown for clarity). The tension on the bungee cords produces an urging force for the firing ram to return to the resting configuration shown in FIG. 4. When the user retracts the firing ram to a preferred position, the triggering mechanism (not shown for clarity) engages a portion of ratchet teeth on the firing ram (not shown for clarity) and holds the firing ram under urged shifting force in the pre-firing configuration.

Figure 6:
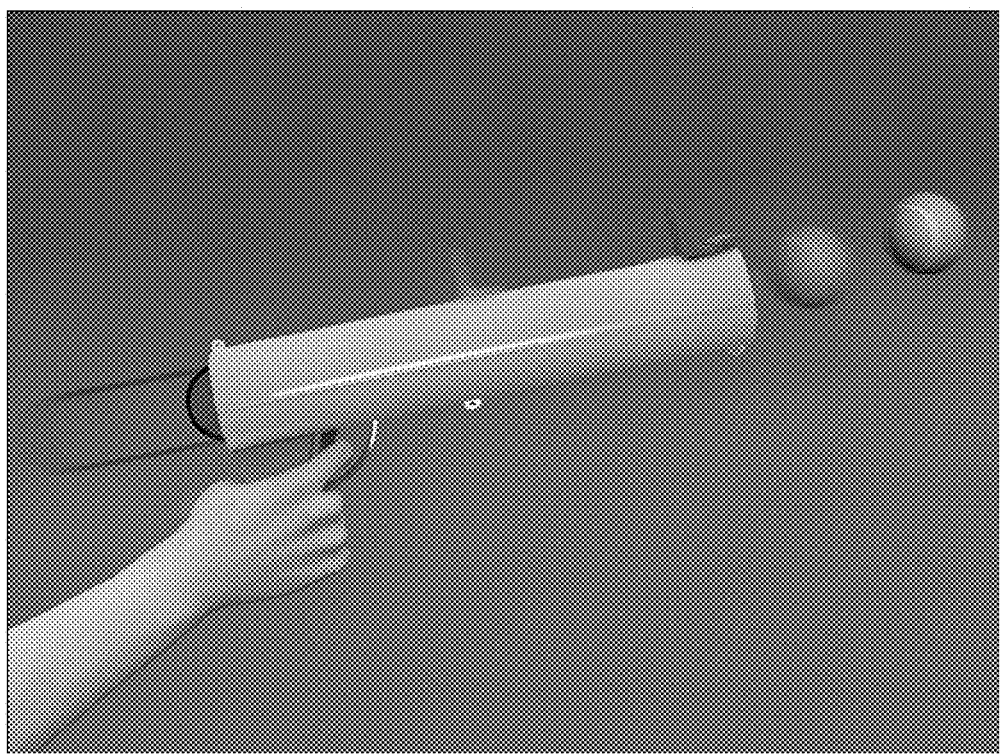
Figure 7:

Referring now to FIG. 6, the user squeezes the trigger arm, causing the triggering mechanism to disengage from the ratcheting teeth and rapidly shift the firing ram toward the resting configuration. The firing ram subsequently contacts the tennis ball at high velocity and ejects the ball from the gun. FIG. 7 shows a boy shooting a tennis ball toward a dog to play fetch according to the aforesaid sequence of steps.

Figure 8:
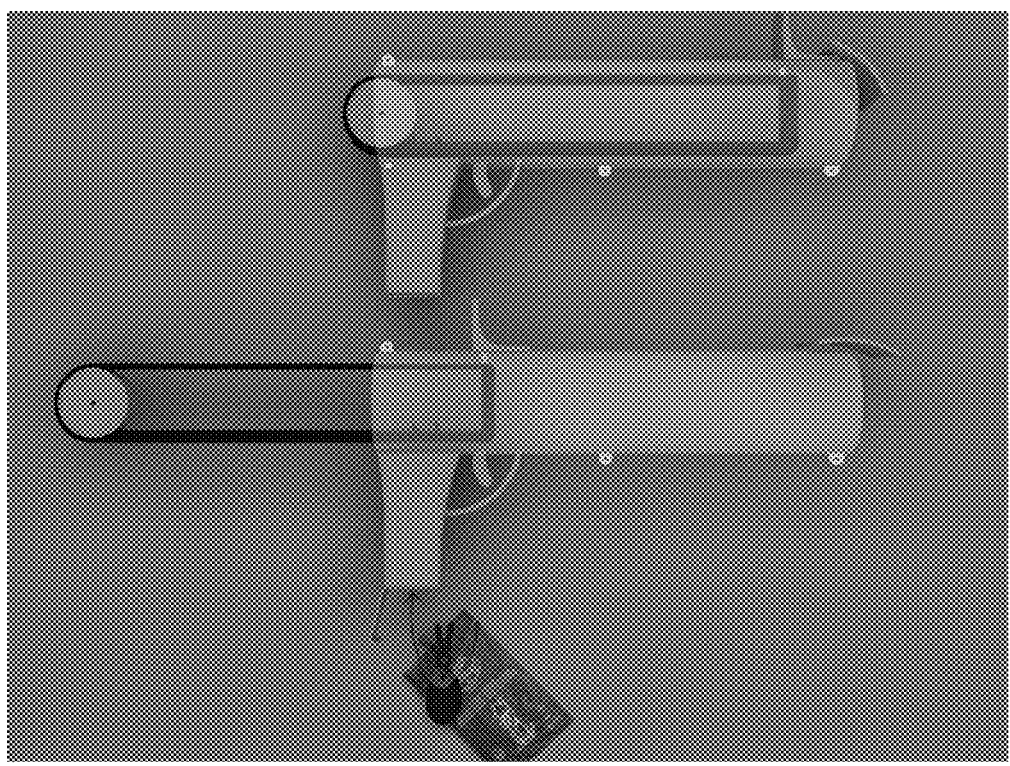
FIG. 8 shows two views of a toy gun according to one embodiment.

Referring now to FIG. 8, one embodiment of a toy gun is shown with the firing ram in the resting configuration (top) and in the pre-firing configuration (bottom). In this embodiment, the integrated firing ram handle is disposed on the top of the gun as opposed to at one end of the gun barrel as described, for example, with respect to FIG. 1. The top of the barrel (the portion opposite the handle) includes an open track that allows the handle, and thus the firing ram, to be shifted from the resting configuration to the pre-firing configuration. The bottom gun also shows a handle having a hollow portion to store articles such as keys, waste bags (as shown), or other items.

A number of illustrative embodiments have been described. Nevertheless, it will be understood that various modifications may be made without departing from the spirit and scope of the various embodiments presented herein. For example, while this disclosure has focused primarily on launching balls from a gun, other projectiles can be substituted. Articles other than bungee cords can be used to propel the firing ram within the barrel as has been described; for example, a firing ram can be propelled by one or more springs, compressed air or gasses, or other means or mechanisms known in the art. Accordingly, other embodiments are within the scope of the following claims.

What is claimed is:

1. A toy gun, comprising:
   a slidable firing ram housed within an elongate gun barrel, said firing ram having first and second end sections spanned by a central member, wherein said first end section protrudes concentrically from said central member and terminates at a distal ball-striking surface, wherein said first end section has a cross-sectional diameter less than that of said central member, and wherein said second end section comprises a graspable handle operable for shifting said firing ram from a resting position to a cocked position by a user, wherein said resting and said cocked positions are different;
   wherein said central member comprises a plurality of recesses linearly disposed along a long axis of said central member;
   wherein each of said recesses is configured to receive a tooth member of a trigger assembly capable of releasable locking said firing ram in said cocked position;
   wherein said trigger assembly comprises a pivotable body comprising a handle portion, said tooth member, and a plurality of platforms disposed on opposite sides of said tooth member that each engage one end of a spring that collectively bias said tooth member into one of said recesses when said firing ram is in said cocked position;
   wherein said barrel comprises a tapered portion capable of holding balls of variable size substantially within said barrel, and wherein a portion of said firing ram is capable of contacting a ball held within said tapered portion when said firing ram is in said resting configuration; and
   wherein an elastic band is coupled to said firing ram and an interior portion of said gun barrel and configured to provide a user-selected urging force that shifts said firing ram from said cocked position to said resting position when said handle portion of said trigger assembly is rotated against said spring bias to disengage said tooth from said recess, and wherein said user-selected urging force provides selectable variability in a ball-launching distance.

2. The toy gun of claim 1, wherein said elastic band is a bungee cord or rubber band.

3. The toy gun of claim 1, further comprising a stop member configured to prevent said firing ram from shifting beyond a chosen point within said barrel as said firing ram shifts from said cocked position to said resting position.

4. The toy gun of claim 3 wherein said stop member is
   a substantially circular wall having a perimeter complimentary in shape to a cross-section of said barrel and a centrally-disposed aperture configured to allow passage of said first end section of said firing ram therethrough.

5. The toy gun of claim 1, wherein said tapered portion capable of holding balls of variable size comprises a tapered collar integral with said barrel, said collar having a diameter substantially equal to a bore of said barrel at a first end, and tapered to have a diameter larger than said bore at a second end, and wherein said second end comprises the terminus of said barrel.

6. The toy gun of claim 1, wherein said tapered portion capable of holding balls of variable size comprises one or more tapered wedges disposed on an interior surface of said barrel that gradually reduces the size of a ball capable of being fit inside said barrel from the terminus of said barrel toward the opposite end of said barrel.

7. The toy gun of claim 6, wherein a base surface of said one or more tapered wedges cooperates as said stop member to prevent said firing ram from shifting beyond a chosen point when said gun is fired.

8. The toy gun of claim 1, wherein said firing ram comprises a spring mechanism fixed to said first end section and oriented to protrude substantially concentrically therefrom, wherein said spring mechanism is configured to boost the ball-launching power of said firing ram when said toy gun is fired.

9. The toy gun of claim 8, wherein said spring mechanism is capable of being releasably locked in a compressed configuration until contact is made with said ball when said gun is fired.

10. The toy gun of claim 9 further comprising wherein said spring mechanism comprises a compressible spring and a releasable lock that holds said spring in a compressed configuration, wherein said releasable lock has a trigger that disengages said lock to allow said spring to decompress when said spring mechanism contacts said ball.

11. A gun capable of launching balls, comprising:
a gun barrel having a central bore therethrough, a firing ram within said barrel, a resilient elastic band connected at one end to said firing ram and at a different end to a portion of said barrel, wherein said firing ram is capable of being shifted from a pre-firing configuration to a resting configuration by a shift-urging force supplied by the resilient elastic band, and wherein said barrel has an end-tapered portion capable of holding balls of various size; and
a firing handle and a stabilization handle integral with said barrel, wherein said firing handle includes a triggering mechanism configured to both: 1) hold said firing ram in said pre-firing configuration when the firing ram is being urged toward said resting configuration by said force, and 2) release said firing ram from said pre-firing configuration when a trigger arm is shifted;
wherein a portion of said firing ram extends into said end-tapered portion of said barrel to cause a ball wedged therein to become dislodged and expelled from said barrel; and
wherein said force is dependent upon a user-selectable shifting distance of said firing ram from said resting configuration to said pre-firing configuration.

12. The gun of claim 11, wherein one or both of said handles includes a hollow interior portion configured to receive storable items.

13. The gun of claim 11, wherein said firing ram comprises:
a handle at a first end, configured to be disposed exterior of said barrel, for grasping and pulling said firing ram into said pre-firing configuration; and
a spring member at a second, opposite end of said firing ram from said first end.

14. The gun of claim 11 further comprising air vents disposed on said barrel for allowing air within said barrel to rapidly escape when said firing ram is shifted from said pre-firing configuration toward the terminus of said barrel.

15. The gun of claim 11 further comprising an armature for holding extra balls.

16. The gun of claim 11, wherein said end-tapered portion is configured to receive tennis balls.

17. A method of exercising dogs, comprising:
providing a toy gun capable of launching tennis balls a user-selected distance that said dog can retrieve to receive exercise, the toy gun comprising:
a slidable firing ram housed within an elongate gun barrel, said firing ram having first and second end sections spanned by a central member, wherein said first end section protrudes concentrically from said central member and terminates at a distal ball-striking surface, wherein said first end section has a cross-sectional diameter less than that of said central member, and wherein said second end section comprises a graspable handle for shifting said firing ram from a resting position to a cocked position by a user, wherein said resting and said cocked positions are different; wherein said central member comprises a plurality of recesses linearly disposed along a long axis of said central member; wherein each of said recesses is configured to receive a tooth member of a trigger assembly capable of releasably locking said firing ram in said cocked position; wherein said trigger assembly comprises a pivotable body having, collectively, a handle portion, said tooth member, and a plurality of platforms disposed on opposite sides of said tooth member that each engage one end of a spring that biases said tooth member into one of said recesses when said firing ram is in said cocked position; wherein said barrel comprises a tapered portion capable of holding balls of variable size substantially within said barrel, and wherein a portion of said firing ram is capable of contacting a ball held within said tapered portion when said firing ram is in said resting configuration; and wherein an elastic band is coupled to said firing ram and an interior portion of said gun barrel and configured to provide a user-selected urging force that shifts said firing ram from said cocked position to said resting position when said handle portion of said trigger assembly is rotated against said spring bias to disengage said tooth from said recess, and wherein said user-selected urging force provides selectable variability in a ball-launching distance.

* * * * *